United States Patent

[11] 3,582,564

[72] Inventor Hans-Ulrich Knauer
Ludwigsburg, Germany
[21] Appl. No. 851,260
[22] Filed Aug. 19, 1969
[45] Patented June 1, 1971
[73] Assignee Internationsl Standard Electric Corporation
New York, N.Y.
[32] Priority Aug. 29, 1968
[33] Germany
[31] P 17 62 804.5

[54] CIRCUIT ARRANGEMENT FOR REGULATING THE TRANSMISSION AND RECEPTION REFERENCE EQUIVALENT OF A SUBSCRIBER STATION IN A TELEPHONE SYSTEM
6 Claims, 2 Drawing Figs.

[52] U.S. Cl. .......... 179/81
[51] Int. Cl. .......... H04m 1/58
[50] Field of Search .......... 179/81 A, 170 D, 170 NC

[56] References Cited

UNITED STATES PATENTS 3,350,510 10/1967 Knauer et al. .......... 179/81A
3,462,560 8/1969 Holzman .......... 179/81A

*Primary Examiner*—Kathleen H. Claffy
*Assistant Examiner*—William A. Helvestine
*Attorneys*—C. Cornell Remsen, Jr., Walter J. Baum, Percy P. Lantzy, J. Warren Whitesel, Delbert P. Warner and James B. Raden

ABSTRACT: Nonlinear networks in the form of semiconductor switches are employed for separate regulation of reception and transmission in a telephone system to compensate for variations in attenuation. Control of the transistors is made proportional to the voltage drop across separate resistors in the feed loop.

Figure 1:
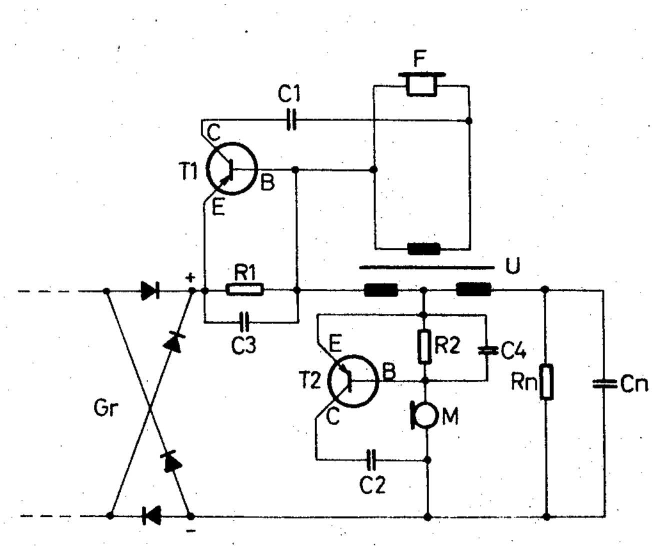

INVENTOR
H. U. KNAUER
BY D. P. Warner
ATTORNEY

CIRCUIT ARRANGEMENT FOR REGULATING THE TRANSMISSION AND RECEPTION REFERENCE EQUIVALENT OF A SUBSCRIBER STATION IN A TELEPHONE SYSTEM

This invention relates to a circuit arrangement for regulating the transmission and reception reference equivalent of a subscriber station in a telephone system via feed-current-dependent nonlinear networks.

A variety of arrangements for automatic attenuation compensation are known, all of which provide a nonlinear network, in which the nonlinear elements are controlled by the voltage drop across a resistor inserted in the feed circuit. Proposed nonlinear elements include rectifiers, thermally controlled resistors, and transistors. The nonlinear element changes its resistance value as a function of the feed current and thus attenuates the subscriber station to a greater or less extent.

If the network is included in the feed loop in the form of a two-terminal network, the attenuation of the subscriber station in the transmitting and receiving directions will be basically changed in the same manner as occurs when shunted across the two-wire input of the hybrid leads to trimming of the hybrid balance, this type of attenuation compensation is always associated with impairment of the sidetone attenuation. As is well known, this also impairs intelligibility.

The case is similar with arrangements which vary only the transmission reference equivalent as a function of the line current. Since the regulating arrangement is inserted only in the four-wire circuit of the microphone, the sidetone attenuation will be impaired in a similar manner. If the nonlinear network is disposed in the input of the hybrid circuit there is the additional drawback that the transmission and reception reference equivalents will be changed to the same extent. Thus, it is not possible to regulate the transmission and reception attenuation differently.

If is an object of the invention to provide a circuit arrangement for regulating the transmission and reception reference equivalents of a subscriber station in a telephone system via feed-current-dependent nonlinear networks, in which the transmission and reception reference equivalents may be automatically regulated independently of each other and without impairment of the sidetone attenuation. The new circuit arrangement is characterized in that across each electroacoustic transducer in the subscriber station there is shunted a separate nonlinear network in the form of a semiconductor switch whose resistance value is controllable by the voltage drop across an associated low-resistance resistor in the feed loop. Since the nonlinear semiconductor switch is directly shunted across the four-wire outputs of the hybrid circuit, the hybrid balance and thus the sidetone attenuation remain unchanged independently of the feed current. The operating point of the semiconductor switch may be set by the magnitude of the controlling voltage drop such that the regulation of the semiconductor switch may even be matched to unequal hybrid through attenuation if necessary.

According to a further aspect of the invention, the hybrid circuit in the subscriber station can be a so-called resistance hybrid, which may be built together with the balancing networks by integrated techniques.

Figure 2:
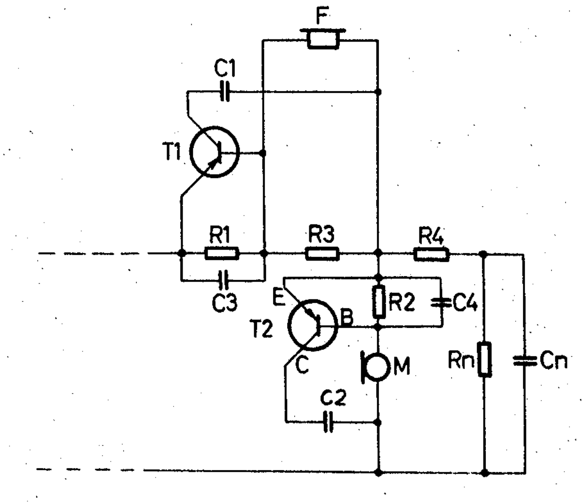

The invention is further described with reference to two embodiments shown in the drawings, in which:

FIG. 1 shows the speaking and listening circuits of a subscriber station comprising a hybrid transformer and the balancing networks of the invention, FIG. 2 shows a subscriber station comprising a resistance hybrid and the balancing networks of the invention.

As can be seen from FIG. 1, the subscriber station is connected to the trunk via a Graetz bridge Gr. This Graetz bridge ensures that the active elements T1 and T2 of the balancing networks receive the correct polarity irrespective of the polarity of the feed voltage.

The hybrid transformer U is closed on the balancing side by the network comprising the resistor R*n* and the capacitor C*n*, which form a substitute circuit for the resistance of the trunk. In the balanced state the two four-wire sides of the hybrid circuit comprising the telephone receiver F and the telephone transmitter M are decoupled from each other. The sidetone attenuation is, therefore, great.

The low-resistance resistors R1 and R2 are inserted in the feed loop. The voltage drop across these resistors is passed to the base-emitter circuit of the transistors T1 and T2, while the collector-base circuits are shunted across the receiver F and transmitter M respectively via capacitors C1 and C2 respectively.

Dependent on the magnitude of the power current the transistors T1 and T2 are modulated to a greater extent. The resistance of the transistor become smaller on the output side, so that the associated electroacoustic transducer is attenuated accordingly. As the line current increases the resistance of the transistor decreases with corresponding increase in the attenuation.

If the hybrid circuit is designed symmetrically, the nonlinear networks comprising the resistors R1 and R2, the resistors T1 and T2 and the capacitors C1 and C2 may be identical.

The low-resistance resistor, from which the controlling DC voltage for the transistor is tapped, is always on the hybrid side of the feed loop which is associated with or adjacent to the controlled electroacoustic transducer. One terminal of the low-resistance resistor is always connected to the associated electroacoustic transducer, and at this junction point the base of the associated transistor is connected.

In the embodiment shown in FIG. 2 the hybrid transformer U of FIG. 1 is replaced by two resistors R3 and R4 which, together with the resistance of the truck and the balancing network R*n*, C*n*, form a bridge circuit. This bridge circuit is such that the attenuation from the receiver F to the transmitter M and vice versa is great. In the embodiment the transmission and reception reference equivalents are again regulated separately. The construction of the balancing networks has remained the same.

The arrangement shown in FIG. 2, which contains only resistors, capacitors and semiconductors, is particularly suitable for manufacture by integrated techniques.

The low-resistance resistors R1 and R2 in the two arrangements may be AC bypassed by capacitors C3 and C4 respectively.

While the principles of the invention have been described above in connection with specific apparatus and applications, it is to be understood that this description is made only by way of example and not as a limitation on the scope of the invention.

I claim:

1. A circuit arrangement for regulating the transmission and reception reference equivalents of a subscriber station in a telephone system via feed-current-dependent nonlinear networks, comprising input and output electroacoustic transducers in a subscriber station including a hybrid circuit, a separate nonlinear network in the form of a semiconductor switch shunted across each transducer, and means for applying a voltage drop across an associated low-resistance resistor in the feed loop to control the resistance of each semiconductor switch.

2. A circuit arrangement as claimed in claim 1, in which each semiconductor switch is a transistor, means are provided for connecting the base-emitter circuit of each transistor to the associated low-resistance resistor in the feed loop and means are provided for shunting the collector-base circuit of each transistor across the associated electroacoustic transducer via a capacitor.

3. A circuit arrangement as claimed in claim 2, in which one terminal of the low-resistance resistor is always connected to the associated electroacoustic transducer and the base of the associated transistor is connected at that junction point.

4. A circuit arrangement as claimed in claim 1 in which the hybrid circuit in the subscriber station is a resistance hybrid.

5. A circuit arrangement as claimed in claim 4, in which the hybrid circuit and the balancing networks employ integrated circuits.

6. A circuit arrangement as claimed in claim 2 in which the low-resistance resistor for the control of the transistor is inserted in the feed loop on that side of the hybrid associated with or adjacent to the controlled electroacoustic transducer.